US012676683B2

(12) United States Patent
Akkalkot et al.

(10) Patent No.: US 12,676,683 B2
(45) Date of Patent: Jul. 7, 2026

(54) METHODS AND SYSTEMS OF PHASE ALIGNING A REPLICA CARRIER SIGNAL FOR USE IN DEMODULATING A SUBCARRIER SIGNAL

(71) Applicant: Tektronix, Inc., Beaverton, OR (US)

(72) Inventors: Archana I. Akkalkot, Bengaluru (IN); Alka Kumari, Bengaluru (IN); Sakchi Sinha, Bengaluru (IN)

(73) Assignee: Tektronix, Inc., Beaverton, OR (US)

( * ) Notice: Subject to any disclaimer, the term of this patent is extended or adjusted under 35 U.S.C. 154(b) by 230 days.

(21) Appl. No.: 18/444,452

(22) Filed: Feb. 16, 2024

(65) Prior Publication Data

US 2024/0283549 A1 Aug. 22, 2024

(30) Foreign Application Priority Data

Feb. 17, 2023 (IN) .............................. 202321010835
Feb. 17, 2023 (IN) .............................. 202321010862

(51) Int. Cl.
*H04B 17/20* (2015.01)
*H04B 17/00* (2015.01)
*H04B 17/309* (2015.01)

(52) U.S. Cl.
CPC ....... *H04B 17/201* (2023.05); *H04B 17/0085* (2013.01); *H04B 17/309* (2015.01)

(58) Field of Classification Search
CPC . H04B 17/201; H04B 17/309; H04B 17/0085
See application file for complete search history.

(56) References Cited

U.S. PATENT DOCUMENTS

2009/0122925 A1* 5/2009 Jaffe ..................... H04L 1/0066
375/341
2011/0064165 A1 3/2011 Bae et al.
(Continued)

FOREIGN PATENT DOCUMENTS

CN          105574456 A     5/2016
EP            2564229 B2     7/2020
EP            4092913 A1    11/2022

OTHER PUBLICATIONS

Korean Intellectual Property Office, International Search Report and Written Opinion for International Application No. PCT/US2024/016285, Jun. 27, 2024, 10 pages, Daejeon, Republic of Korea.

*Primary Examiner* — Melvin C Marcelo
(74) *Attorney, Agent, or Firm* — Miller Nash LLP; Andrew J. Harrington

(57) ABSTRACT

A test and measurement system includes a proximity coupling device to transmit a modulated carrier signal and a proximity integrated circuit card to load modulate the transmitted modulated carrier signal and generate a modulated subcarrier signal on the wireless carrier signal. A test and measurement instrument acquires the modulated carrier signal and includes a phase-aligned subcarrier demodulator to demodulate the carrier signal including the modulated subcarrier signal. A demodulator detects commands and responses in the modulated carrier signal, removes the commands, and identifies a correlation index for each response. Each correlation index indicates a phase of the modulated carrier signal of the corresponding response relative to a replica carrier signal. The demodulator adjusts the phase of the replica carrier signal based on the correlation index for each response and down converts each response using the phase-aligned replica carrier signal. The modulated subcarrier signal is low pass filtered to demodulate response.

20 Claims, 8 Drawing Sheets

(56) References Cited

U.S. PATENT DOCUMENTS

| 2011/0206142 A1 | 8/2011 | Sung |
| 2015/0207574 A1 | 7/2015 | Schoen et al. |
| 2016/0315656 A1 | 10/2016 | Engelien-Lopes et al. |
| 2017/0302330 A1* | 10/2017 | Jayasimha ......... H04B 7/18513 |
| 2020/0334189 A1 | 10/2020 | Yang et al. |
| 2021/0168002 A1 | 6/2021 | Yun et al. |
| 2021/0336824 A1 | 10/2021 | Tajalli |
| 2022/0261608 A1 | 8/2022 | Qi et al. |
| 2022/0318530 A1 | 10/2022 | Kasík et al. |
| 2022/0337266 A1 | 10/2022 | Choi |

* cited by examiner

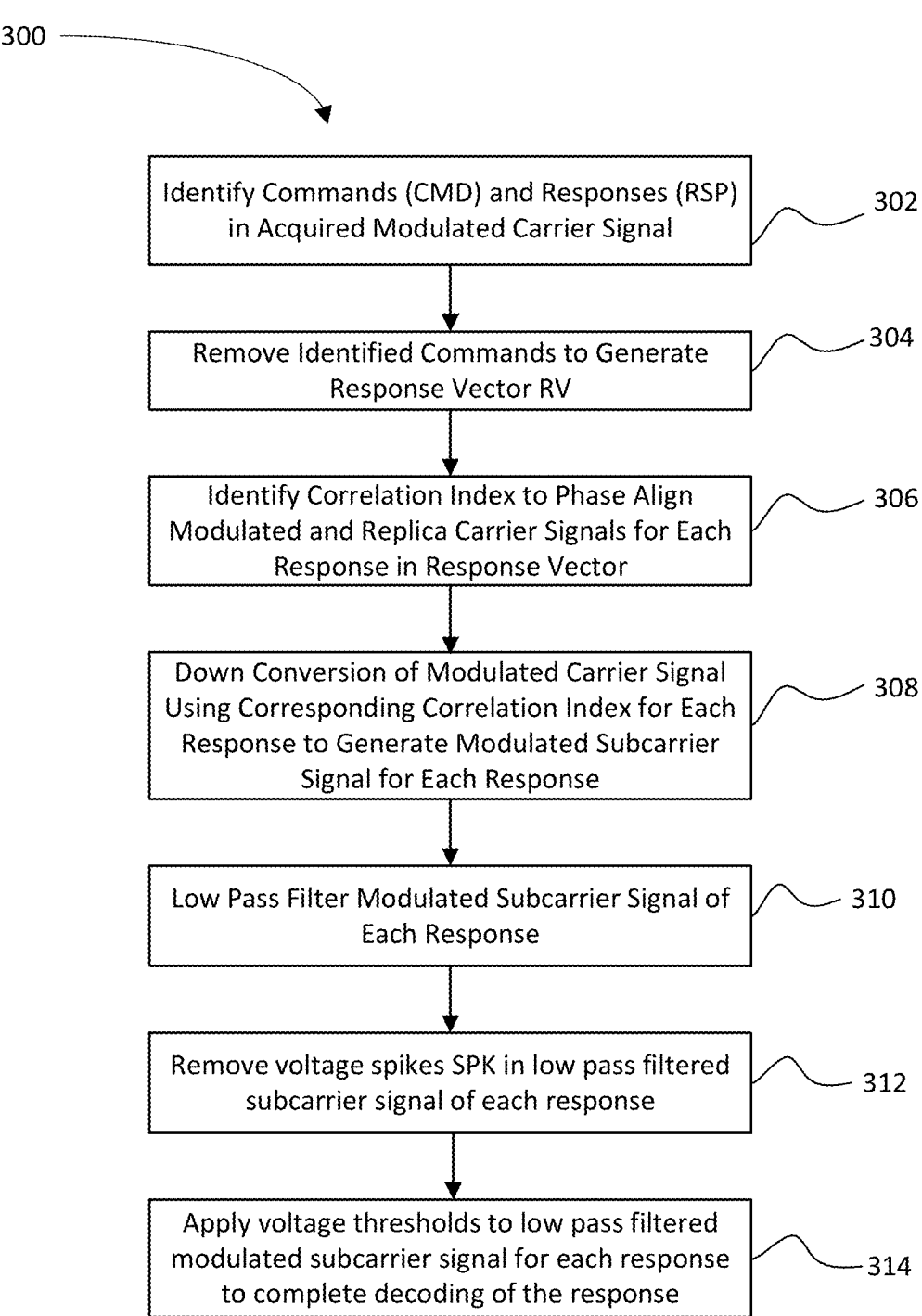

300

Identify Commands (CMD) and Responses (RSP) in Acquired Modulated Carrier Signal ~ 302

Remove Identified Commands to Generate Response Vector RV ~ 304

Identify Correlation Index to Phase Align Modulated and Replica Carrier Signals for Each Response in Response Vector ~ 306

Down Conversion of Modulated Carrier Signal Using Corresponding Correlation Index for Each Response to Generate Modulated Subcarrier Signal for Each Response ~ 308

Low Pass Filter Modulated Subcarrier Signal of Each Response ~ 310

Remove voltage spikes SPK in low pass filtered subcarrier signal of each response ~ 312

Apply voltage thresholds to low pass filtered modulated subcarrier signal for each response to complete decoding of the response ~ 314

FIG. 3

METHODS AND SYSTEMS OF PHASE ALIGNING A REPLICA CARRIER SIGNAL FOR USE IN DEMODULATING A SUBCARRIER SIGNAL

CROSS-REFERENCE TO RELATED APPLICATIONS

This disclosure claims priority under 35 U.S.C. § 119 to Indian Provisional Patent Application No. 202321010835, filed Feb. 17, 2023, titled "METHOD TO DEMODULATE NFC ISO/IEC 14443A STANDARD USING ON-OFF KEYING FOR RESPONSE DECODE ON NFC BUS ON OSCILLOSCOPE," and Indian Provisional Patent Application No. 202321010862, filed Feb. 17, 2023, titled "METHOD TO GET NFC ISO/IEC14443B STANDARD RESPONSE DECODE FOR NFC BUS ON OSCILLO-SCOPE," the disclosures of both of which are incorporated herein by reference in their entirety.

TECHNICAL FIELD

The present disclosure relates generally to the demodulation of a modulated subcarrier signal on a carrier signal, and more specifically to phase aligning a replica carrier signal for use in demodulating a modulated subcarrier signal.

BACKGROUND

Near Field Communication (NFC) is a series of wireless communications protocol standards defining communication between two electronic devices spaced a short-range from one another. NFC provides communication between two NFC-enabled electronic devices through a modulated carrier signal and magnetic field coupling of two antennas on the two NFC-enabled electronic devices. Many different types of electronic devices utilize NFC in a wide variety of applications such as mobile payments and radio frequency identification (RFID) tags for applications such as access authentication for doors of residential and commercial build-ings as well as vehicles. NFC-enabled electronic devices may be passive devices like RFID tags or active devices like smartphones or payment terminals that initiate a communi-cation session with a proximate passive device. This com-munication is termed "near field" communications because the distance between two devices is much less than the length of a wavelength of the modulated carrier signal. For example, when the modulated carrier signal is a 13.56 MHz carrier signal, the wavelength is approximately twenty-two (22) meters while typical distance between the polling and listening NFC-enabled devices is on the order of 10 cm or less.

A typical NFC system includes a Proximity Coupling Device (PCD) and a Proximity Integrated Circuit Card (PICC). The PCD may also be referred to as a "reader" or "polling device" and the PICC referred to as a "tag" or "listening device" in the present description. The PCD and PICC are magnetically coupled to wirelessly communicate through one of the NFC standard communication protocols, with the PCD modulating an amplitude of a carrier signal to communicate commands to the PICC and the PICC decod-ing and responding to these commands through load modu-lation. Different types of load modulation are utilized in different NFC standards. NFC-A type devices communicate according to the ISO/IEC 14443A standard in which a PCD utilizes amplitude modulation to send commands to a PICC which, in turn, responds to these commands utilizing on-off keying (OOK) for the load modulation, where OOK is a type of amplitude-shift keying (ASK). NFC-B type devices com-municate according to the ISO/IEC 14443B standard in which a PCD utilizes amplitude modulation to send com-mands to a PICC and the PICC utilizes load modulation to generate a binary phase shift keying (BPSK) modulated signal to respond to these commands.

The number of applications in which NFC is being utilized is ever increasing, and in each such new application the testing of NFC-enabled devices is important to ensure proper operation. Manufacturers of test and measurement equipment, such as oscilloscopes, manufacture mixed signal oscilloscopes (MSOs) that include radio frequency (RF) channels for testing of wireless electronic devices such as NFC-enabled devices. As part of testing NFC-enabled devices, the oscilloscope demodulates a received wireless signal using the appropriate demodulation. This demodula-tion typically includes generation of a replica carrier signal in the oscilloscope for down conversion of the received wireless signal. When a replica carrier signal is utilized for demodulation, phase synchronization of the replica carrier signal and the modulated carrier signal transmitted by the PCD is required. Any phase difference may result in distor-tion of the demodulated signal. Techniques for phase syn-chronization of carrier signals are known, but many of these known techniques may be relatively computationally inten-sive and thus more difficult to implement in devices having more limited computational resources, such as test and measurement instruments. Accordingly, there is a need for improved techniques of demodulating wireless signals which may be implemented in test and measurement instru-ments like oscilloscopes or other devices to enable the instruments to conduct, for example, testing of NFC-enabled devices.

BRIEF DESCRIPTION OF ACCOMPANYING DRAWINGS

FIG. 3 is a flowchart of an example demodulation process executed by the phase-aligned subcarrier demodulator of FIG. 1 in accordance with some embodiments of the present disclosure.

Figure 1:
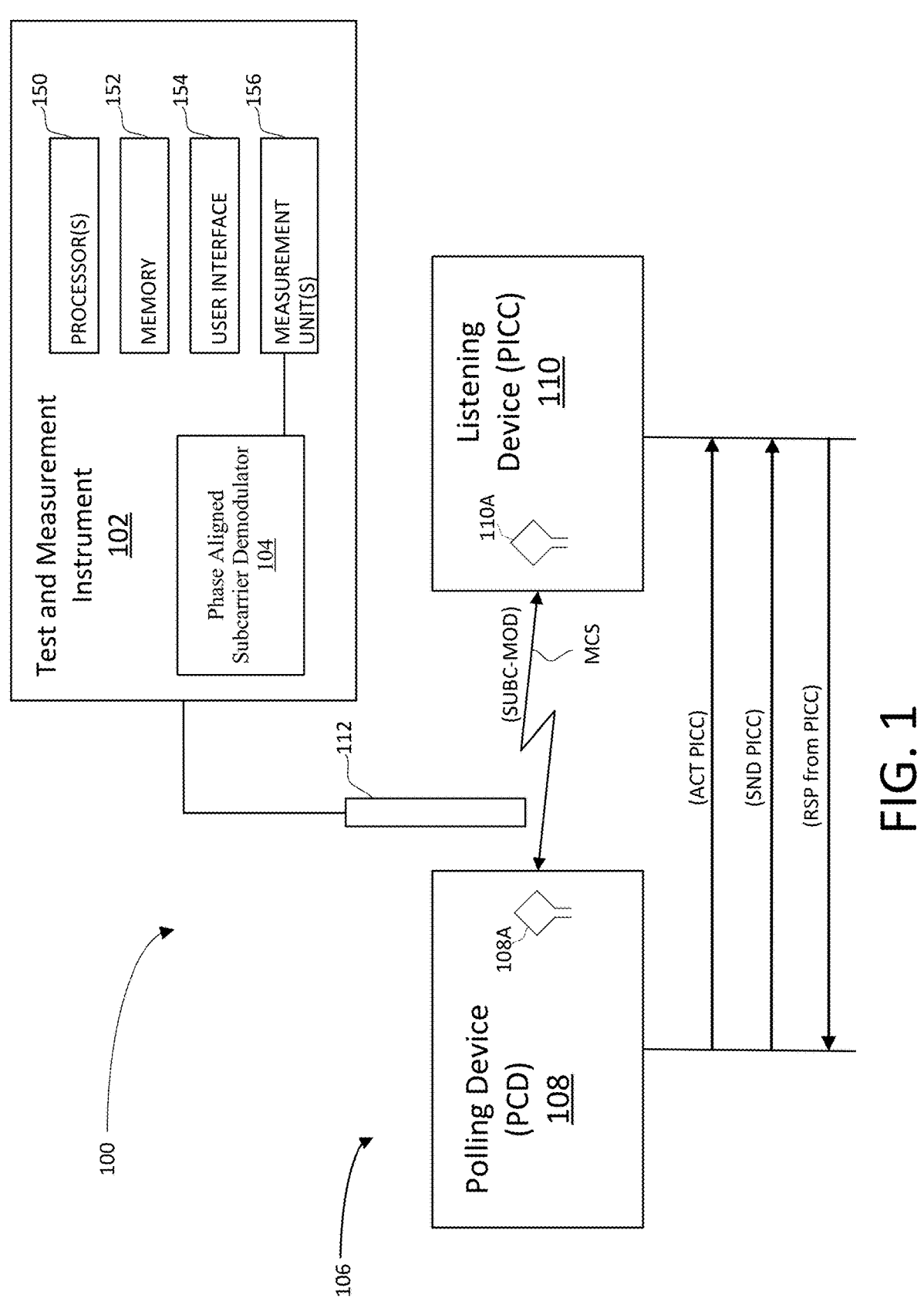
FIG. 1 illustrates a test and measurement system includ-ing a test and measurement instrument including a phase-aligned subcarrier demodulator for use in testing NFC-enabled devices in accordance with some embodiments of the present disclosure.

FIGS. 4A, 4B, 4C, 4D, 4E, and 4F are signal diagrams showing signals utilized and generated by the phase-aligned demodulator of FIG. 1 during operation with NFC-A type devices in decoding OOK modulated subcarrier signals in accordance with some embodiments of the present disclo-sure.

FIGS. 5A, 5B, 5C, and 5D are signal timing diagrams showing the suppression or removal of spikes contained in a demodulated subcarrier signal that is provided to a low pass filter in the phase-aligned subcarrier demodulator of FIG. 1 in accordance with some embodiments of the present disclosure.

Figure 6A:
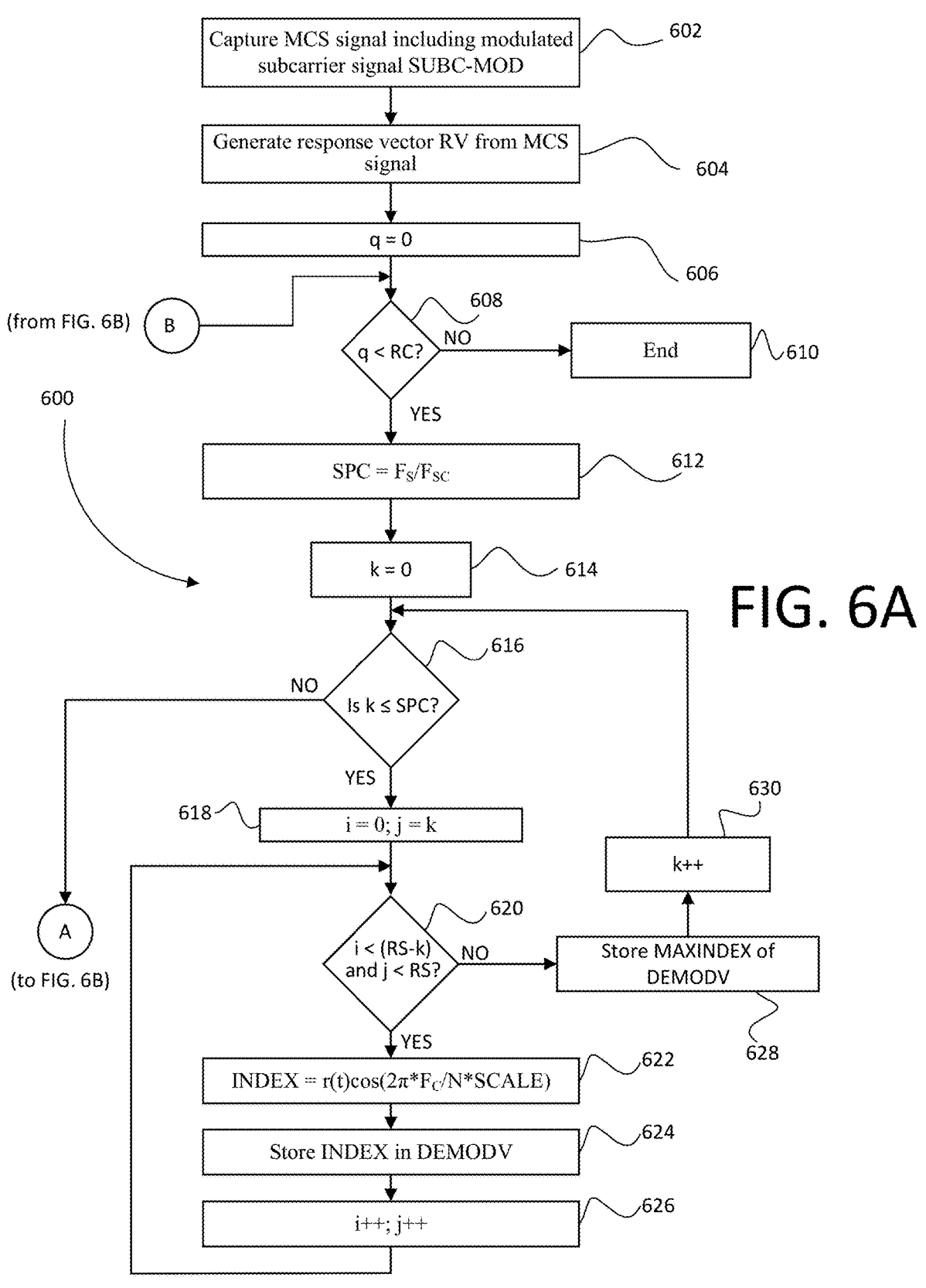
Figure 6B:
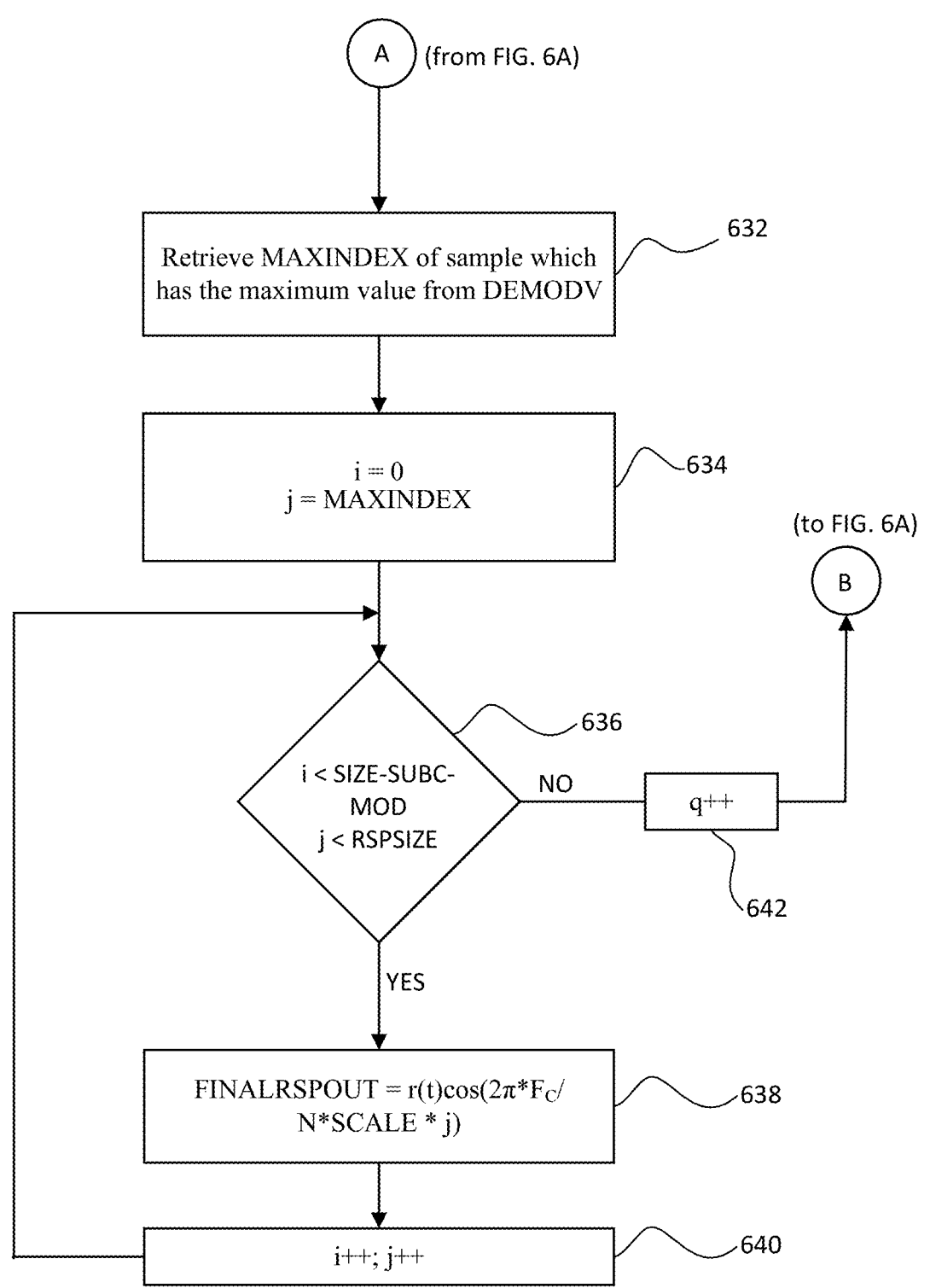

FIGS. 6A and 6B are a flowchart illustrating in more detail a demodulation process executed by the phase-aligned demodulator of FIG. 1.

FIGS. 7A, 7B, 7C, 7D, 7E, and 7F are signal timing diagrams showing signals utilized and generated by the phase-aligned demodulator of FIG. 1 during operation with NFC-B type devices in decoding BPSK modulated subcarrier signals in accordance with some embodiments of the present disclosure.

DETAILED DESCRIPTION

Embodiments of the present disclosure are directed to methods of demodulating a modulated subcarrier signal and systems for performing this demodulation. Conventional demodulation of a modulated carrier signal including a modulated subcarrier signal requires the generation of a replica carrier signal by a device receiving the modulated carrier signal. The replica carrier signal is used in down conversion of the modulated carrier signal as part of demodulating the modulated subcarrier signal. In embodiments of the present disclosure, a test and measurement instrument captures a modulated carrier signal generated by NFC-enabled devices, and a phase-aligned subcarrier demodulator generates a phase-aligned replica carrier signal that is used in demodulating the modulated subcarrier signal contained on the captured modulated carrier signal. The NFC-enabled devices include a polling and a listening device and where these are NFC-A type devices the modulated subcarrier signal is an OOK modulated subcarrier signal. Where the NFC-enabled devices are NFC-B type devices the modulated subcarrier signal is a BPSK modulated subcarrier signal. The phase-aligned subcarrier demodulator operates to initially detect commands and responses contained in the captured modulated carrier signal and to mute or remove these detected commands to generate a response vector including only the responses contained in the captured modulated carrier signal. The phase-aligned subcarrier demodulator then identifies a correlation index for each response in the response vector, each correlation index indicating a phase of the modulated carrier signal of the corresponding response relative to a replica carrier signal. The demodulator adjusts a phase of the replica carrier signal based on the correlation index for each response in the response vector to phase align the replica carrier signal and modulated carrier signal for the response and demodulates each response in the response vector using the replica carrier signal having the corresponding adjusted phase to generate a demodulated response vector including a plurality of demodulated responses. The demodulated response vector is the low pass filtered as part of generating a demodulated response vector. For NFC-A type devices, the phase-aligned subcarrier demodulator further operates to suppress voltage peaks or spikes that are generated due to the phase change resulting from removal of the commands in the response vector and subsequent low pass filtering after down conversion of the response vector.

FIG. 1 is a block diagram of a test and measurement system 100 including a test and measurement instrument 102 that includes a phase-aligned subcarrier demodulator 104 for demodulating a modulated subcarrier signal SUBC-MOD during testing of to one embodiment of a portion in accordance with embodiments of the present disclosure. The test and measurement instrument 102 includes one or more main processors 150 that may be configured to execute instructions from main memory 152 and may perform any methods and/or associated steps indicated by such instructions. A user interface 154 is coupled to the one or more processors 150 and may include, for example, a keyboard, mouse, touchscreen, output display, file storage, and/or any other controls employable by a user to interact with the test and measurement instrument 102. In some embodiments the user interface 154 may be connected to or controlled by a remote interface (not illustrated), so that a user may control operation of the instrument 102 in a remote location physically away from the instrument. A display portion of the user interface 154 may be a digital screen such as an LCD, or any other monitor to display waveforms, measurements, and other data to a user. In some embodiments, the main output display of the user interface 154 may also be located remote from the instrument 102.

One or more measurement units 156 perform the main functions of measuring parameters and other qualities of signals from the NFC-enabled devices 106 being measured by the instrument 102. Typical measurements include measuring voltage, current, and power of input signals in the time domain, as well as measuring features of the signals in the frequency domain. The measurement units 156 represent any measurements that are typically performed on test and measurement instruments, and the phase-aligned subcarrier demodulator 104 may be integrated within or coupled to such measurement units 156.

FIG. 1 also illustrates NFC-enabled devices 106 including a polling device or Proximity Coupling Device (PCD) 108 and a listening device or Proximity Integrated Circuit Card (PICC) 110, which may be either NFC-A or NFC-B type devices in the embodiments of the test and measurement system 100. The NFC-enabled devices 106 communicate through NFC communications in the form of a modulated carrier signal MCS that is generated according to the ISO/IEC 14443A or ISO/IEC 14443B standard. A radio frequency (RF) probe 112 is coupled to an input of the test and measurement instrument 102 and is suitably positioned, or coupled to the listening device 110, to sense the modulated carrier signal MCS. In operation, the polling device 108 transmits the wireless modulated carrier signal MCS to both power and communicate commands to the listening device 110. The listening device 110 performs load modulation of the modulated carrier signal MCS to generate the modulated subcarrier signal SUBC-MOD on the modulated carrier signal for communicating responses to the polling device 108.

The type of load modulation implemented by the listening device 110 depends on whether the polling and listening devices 108, 110 are NFC-A or NFC-B type devices. When NFC-A type devices, the listening device 110 utilizes on-off keying (OOK) load modulation to generate an OOK modulated subcarrier signal SUBC-MOD on the modulated carrier signal MCS. When NFC-B type devices, the listening device 110 utilizes binary phase shift keying (BPSK) load modulation to generate a BPSK modulated subcarrier signal SUBC-MOD on the modulated carrier signal MCS. The polling device 108 utilizes amplitude shift keying (ASK) of the modulated carrier signal MCS to communicate commands to the listening device 110 for both NFC-A and NFC-B type devices, although the characteristics of the ASK modulation implemented by the polling device varies depending on the type of devices as defined in the ISO/IEC 14443A and 14443B standards.

During testing of the NFC-enabled devices 106, the test and measurement instrument 102 captures the modulated carrier signal MCS as sensed by the RF probe 112, and the phase-aligned subcarrier demodulator 104 generates a phase-aligned replica carrier signal RCS that is used in demodulating the modulated subcarrier signal SUBC-MOD contained on the captured modulated carrier signal, as will be described in more detail below. Where the polling and listening devices 108, 110 are NFC-A type devices, the modulated subcarrier signal SUBC-MOD is an OOK modulated subcarrier signal as mentioned above, and in this embodiment the phase-aligned subcarrier demodulator 104 further operates to initially detect commands CMD and responses RSP contained in the captured modulated carrier signal MCS and to mute or remove these detected commands to generate a response vector RSPVEC including only the responses contained in the captured modulated carrier signal. In this embodiment, the phase-aligned subcarrier demodulator 104 further operates to suppress voltage peaks or spikes that are generated in a low pass filtered demodulated subcarrier signal LPF-SUBC-DEMOD that is generated through low pass filtering of the OOK modulated subcarrier signal SUBC-MOD. The operation of the phase-aligned subcarrier demodulator 104 in removing detected commands and suppressing such voltage spikes will be described in more detail below.

As previously mentioned, the polling device 108 and listening device 110 communicate through NFC communications, with the modulated carrier signal MCS representing this NFC communications in FIG. 1. The characteristics of the modulated carrier signal MCS and NFC communications between the polling and listening devices 108, 110 will now be briefly described in more detail in order to better understand the operation the phase-aligned subcarrier demodulator 104 according to embodiments of the present disclosure. Each of the polling and listening devices 108, 110 includes a respective antenna 108A, 110A, each antenna coupled to electronic components (not shown) in the corresponding polling or listening device 108, 110. These antennas 108A, 110A are physically positioned proximate one another so that the antennas are inductively coupled through the modulated carrier signal MCS in the same way as are inductors of a transformer. The antennas 108A, 110A may thus be viewed as coils of an air core transformer, with the modulated carrier signal MCS representing an alternating magnetic field that is generated by the polling device 108 through an alternating signal applied to the antenna 108A. This alternating signal is a 13.56 MHz carrier signal as specified in the ISO/IEC 14443A and 14443B standards when the polling and listening devices 108, 110 are NFC-A and NFC-B type devices. Those skilled in the art will understand the characteristics of the magnetic coupling and the NFC between the antennas 108A, 110A relative to conventional far field propagation of electromagnetic signals between antennas. Accordingly, the characteristics of NFC are discussed briefly herein but are not described in detail as such details are not necessary for an understanding of embodiments of the present disclosure.

In operation during an NFC communication session, the polling device 108 and listening device 110 communicate commands CMD and responses RSP through the modulated carrier signal MCS to exchange information. An NFC communication session is represented in FIG. 1 through an activate PICC command ACT-PICC, a send PICC command SND-PICC, and a response RSP from the PICC listening device 110. The polling device 108 occasionally transmits the modulated carrier signal MCS to determine whether any listening devices 110 are located proximate the polling device. When the listening device 110 is proximate the polling device 108, the modulated carrier signal MCS is received by the antenna 110A of the listening device 110 and, where the listening device is a passive device, this signal is rectified and used to provide electrical power to electrical components in the listening device. This receipt of the modulated carrier signal MCS and generation of power therefrom corresponds to the activate PICC command ACT- PICC of FIG. 1. After the activate PICC command ACT-PICC, the polling device 108 provides a send PICC command SND-PICC to the listening device 110 by modulating the modulated carrier signal MCS. The type of modulation used by the polling device 108 to communicate send PICC commands SND-PICC is ASK as mentioned above, according to either the ISO/IEC 14443A or 14443B standard when the polling and listening devices 108, 110 are NFC-A and NFC-B type devices, respectively.

The listening device 110 receives the ASK-modulated carrier signal MCS and demodulates the signal to decode the SND-PICC command sent by the polling device 108. The listening device 110 then processes the decoded SND-PICC command and sends an appropriate response RSP corresponding to the decoded command. To send the response, the listening device 110 load modulates the modulated carrier signal MCS. Load modulation varies an impedance of the antenna 110A of the listening device 110 and, due to the magnetic coupling of the antennas 108, 110A, this variation of impedance of the antenna 110A causes a change in the signal at the antenna 108A of the polling device 108. In this way, the listening device 110 modulates the modulated carrier signal MCS to send a response RSP to the polling device 108. Where the polling and listening devices 108, 110 are NFC-A or NFC-B type devices communicating according to the ISO/IEC 14443A or 14443B standards, the listening device 110 uses a subcarrier signal at 848 KHz that is modulated through OOK or BPSK. The frequency of the subcarrier signal is determined by a modulating factor N, where the subcarrier has a frequency $F_{SC}$ that is given by the a frequency $F_C$ of the modulated carrier signal divided by the modulating factor N ($F_{SC}=(F_C/N)$). If $F_C=13.56$ MHz and N=16, then $F_{SC}=(13.56 \text{ MHz}/16)=848$ KHz. Thus, the listening device 110 load modulates the modulated carrier signal MCS to include either an OOK-modulated subcarrier signal (NFC-A) or a BPSK-modulated subcarrier signal (NFC-B) containing the response RSP to the command SND-PICC sent by the polling device 108. It is this OOK-modulated subcarrier signal or BPSK-modulated subcarrier signal forming the response RSP from the listening device 110 that the phase-aligned subcarrier demodulator 104 of the test and measurement instrument 102 demodulates during testing of the polling and listening devices 108, 110, as will now be described in more detail with reference to FIGS. 1-3.

Figure 2:
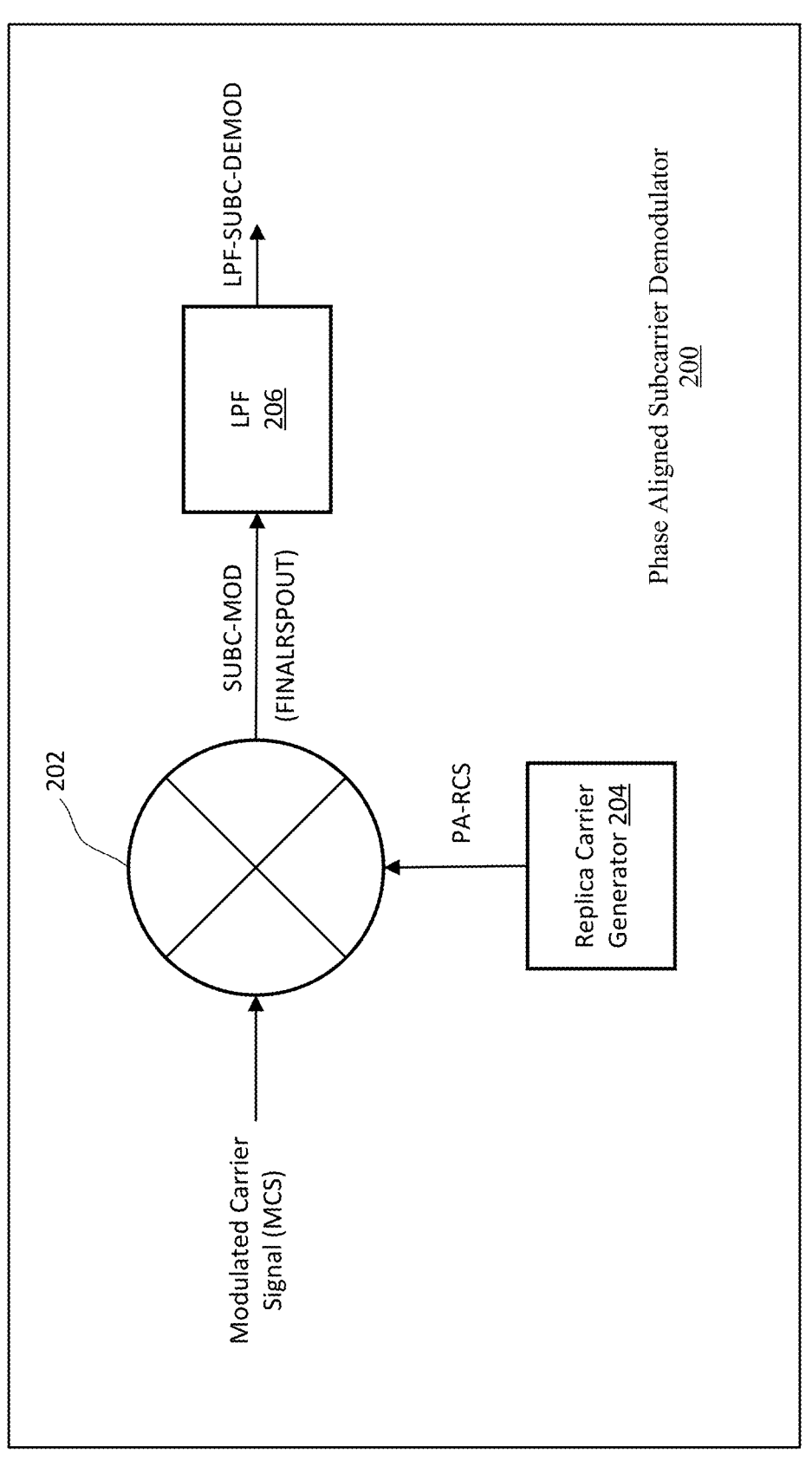
FIG. 2 is a more detailed block diagram of a portion of the phase-aligned subcarrier demodulator of FIG. 1 in accor-dance with some embodiments of the present disclosure.

FIG. 2 is a more detailed block diagram of a phase-aligned subcarrier demodulator 200 in accordance with some embodiments of the present disclosure. The phase-aligned subcarrier demodulator 200 corresponds to one embodiment of a portion of the phase-aligned subcarrier demodulator 104 of FIG. 1. The phase-aligned subcarrier demodulator 200 may, for example, be implemented through suitable instructions stored in memory 152 and executed by the one or more processors 150 in the test and measurement instrument 102 of FIG. 1. In the demodulator 200, a multiplier or mixer 202 receives the modulated carrier signal MCS on a first input and receives on a second input a phase-aligned replica carrier signal PA-RCS generated by a phase-aligned replica carrier generator 204. The mixer 202 multiplies the MCS and PA-RCS signal together to generate a baseband signal in the form of a modulated subcarrier signal SUBC-MOD on an output of the mixer. The modulated subcarrier signal SUBC-MOD is an OOK-modulated subcarrier signal or is a BPSK-modulated subcarrier signal when the modulated carrier signal MCS is an NFC-A or NFC—B type signal (i.e., when the polling and listening devices 108, 110 are NFC-A or NFC-B type devices). A low pass filter 206 receives the modulated subcarrier signal SUBC-MOD output by the mixer 202 and generates a low pass filtered demodulated subcarrier signal LPF-SUBC-DEMOD that is utilized to complete the demodulation of the modulated subcarrier signal SUBC-MOD, which will be discussed in more detail below.

FIG. 3 is a flowchart of a response demodulation process 300 executed by the phase-aligned subcarrier demodulator 104 of FIG. 1 in accordance with some embodiments of the present disclosure. The response demodulation process 300 may be implemented through suitable instructions stored in memory 152 and executed by the one or more processors 150 in the test and measurement instrument 102 of FIG. 1. The response demodulation process 300 will now be described with reference to FIGS. 1, 3, and FIGS. 4A-4F, which are signal diagrams showing signals utilized and generated by the phase-aligned demodulator 104 during operation with NFC-A type NFC-enabled devices 106 in decoding OOK modulated subcarrier signals SUBC-MOD in accordance with some embodiments of the present disclosure. Each of the signal diagrams 4B-4F shows voltage along the vertical axis and time along the horizontal axis while FIG. 4A shows frequency along the horizontal axis and magnitude along the vertical axis.

The process 300 begins in operation 302 and identifies commands CMD from the polling device 108 and responses RSP from the listening device 110 that are contained on the modulated carrier signal MCS. In embodiments of the present disclosure, the operation 302 utilizes edge detection along with known parameters of the commands CMD transmitted by the polling device 108 according to the ISO/IEC 14443A standard to detect the presence of command in the modulated carrier signal MCS. The widths of signal pulses forming the commands CMD thus the durations of these pulses and durations of the commands, which as mentioned above utilize ASK of the modulated carrier signal MCS, are known. In this way, the operation 302 is able to detect the first and last edges or voltage transitions of each command CMD and thereby identify or detect respective commands in the modulated carrier signal MCS. In a similar manner, the operation 302 also detects respective responses RSP in the modulated carrier signal MCS. According to the ISO/IEC 14443A standard, the responses RSP will be received a certain response time after the end (i.e., last edge) of an immediately prior command CMD and will have a known duration. These parameters of the responses RSP on the modulated carrier signal MCS enable detection of the responses relative to the detected commands CMD in operation 302 by the process 300. The start of response RSP relative to the end or final edge of a command is known along with the duration of the response, enabling detection of the portions of the modulated carrier signal MCS containing the responses.

Figures 4A, 4B, 4C, 4D, 4E, 4F:
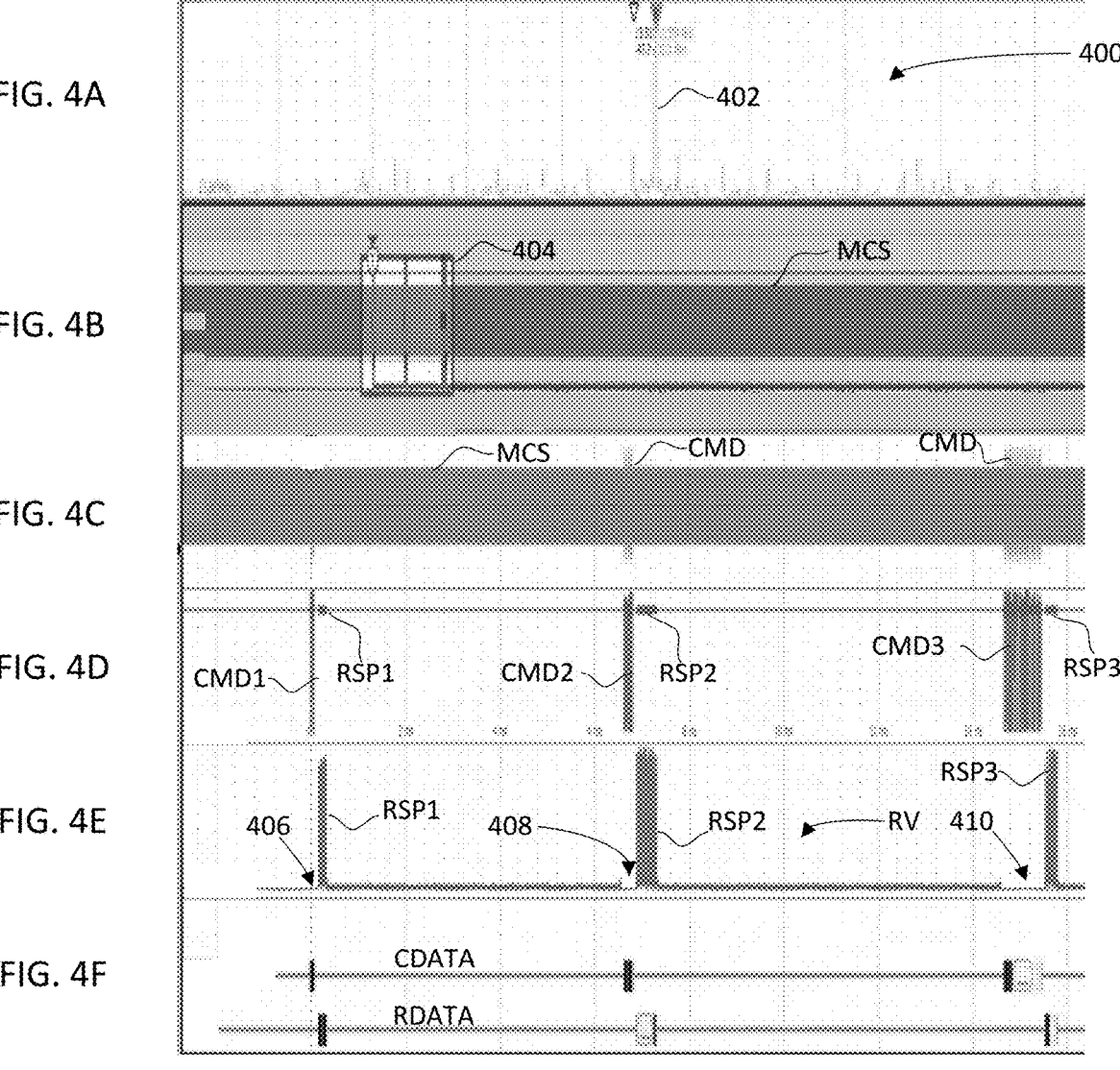

Referring now to FIGS. 4A-4F, the modulated carrier signal MCS as well as commands CMD and responses RSP contained on this carrier signal as captured by the test and measurement instrument 102 (FIG. 1) are shown. Before the process 300 is executed, the test and measurement instrument 102 first captures or acquires the modulated carrier signal MCS. In capturing the modulated carrier signal MCS, the test and measurement instrument 102 digitizes the modulated carrier signal for subsequent processing. Thus, each of the signals being processed by the process 300 is a digital signal, as will be discussed in more detail below with reference to FIGS. 5A and 5B. In the example embodiment illustrated in FIGS. 4A-4F, the test and measurement instrument 102 acquires the modulated carrier signal MCS and performs a frequency domain analysis of the acquired signal to generate a frequency or spectrum view 400 of the acquired signal as shown in FIG. 4A. The spectrum view 400 shows a peak component 402, which is at a frequency of approximately 13.56 MHz and corresponds to the carrier signal as specified in the ISO/IEC 14443A standard.

From the frequency domain analysis as represented in the spectrum view 400, the test and measurement instrument 102 generates in-phase and quadrature (IQ) data corresponding to a time domain representation of the acquired modulated carrier signal MCS. This time domain representation 404 includes commands CMD and responses RSP although not visible in FIG. 4B due to the time scale. FIG. 4C shows the acquired modulated carrier signal MCS on an exploded time scale, with the modulated carrier signal MCS of FIG. 4C corresponding to a portion 404 of the modulated carrier signal MCS of FIG. 4B. Two commands CMD are labeled on the acquired modulated carrier signal MCS in FIG. 4C. FIG. 4D shows the final result of operation 302 having identified all commands CMD and responses RSP in the captured modulated carrier signal MCS. In the example of FIG. 4D, the identified commands include three commands CMD1-CMD3 and the identified responses include three responses RSP1-RSP3.

From operation 302, the process 300 goes to operation 304 and the identified commands CMD in the acquired modulated carrier signal MCS are muted or removed to generate a response vector RV. FIG. 4E illustrates the response vector RV. The voltage scale of the vertical axis in FIG. 4E is expanded to better illustrate the voltage levels of the responses RSP1-RSP3, which are must smaller than the voltage levels of the commands CMD1-CMD3 as seen in FIG. 4D. Removal of the commands CMD1-CMD3 means the voltage levels for the samples of the signal where each command CMD is present are set to zeros. The commands CMD1-CMD3 are removed because the voltage levels of the responses RSP1-RSP3, which are OOK modulated, must be detected in demodulating the responses. Thus, removal of the much larger voltages of the commands CMD1-CMD3 is necessary for reliable detection of the voltage levels of the responses RSP1-RSP3 that is required for demodulating these OOK-modulated responses.

The response vector RV of FIG. 4E includes the three identified responses RSP1-RSP3 with the corresponding commands CMD1-CMD3 having been removed. This removal is indicated at 406 for command CMD1, at 408 for command CMD2, and at 410 for command CMD3. Once generated, the response vector RV then utilized by the phase-aligned subcarrier demodulator 104 to demodulate the responses RSP1-RSP3, as will be described in more detail below. FIG. 4F shows command data CDATA corresponding to the decoded commands CMD encoded on the modulated carrier signal MCS by the polling device 108 and response data RDATA corresponding to responses RSP encoded in the OOK modulated subcarrier signal SUBC-MOD as decoded by the test and measurement instrument 102 (FIG. 1) in accordance with the ISO/IEC 14443A standard in this embodiment. The 14443A standard specifies the format of the commands SND-PICC commands transmitted by polling device 108 and responses RSP from the listening device 110 including defining fields contained in these commands and responses. The test and measurement instrument 102 is configured to utilize this 14443A standard format information in decoding demodulated commands CMD and responses RSP.

Returning to the response demodulation process 300 of FIG. 3, once the response vector RV has been generated in operation 304 the process proceeds to operation 306 and a correlation index CI is generated for each response RSP in the response vector RV. The correlation index CI corresponds to the index of the sample of the response RSP where the voltage is a maximum, which occurs when the phase of the modulated carrier signal MCS is aligned with the phase of the replica carrier signal RCS. Each response RSP will not start at exactly zero phase of the replica carrier signal RCS. The correlation index CI effectively indicates the phasor angle of the response RSP with reference to the replica carrier signal RCS, and will be utilized in adjusting or aligning the phase of the replica carrier signal during demodulation of each response. The operation 306 calculates a correlation index CI for each response RSP. After the correlation index CI for each response RSP is determined in operation 306, the process 300 proceeds to operation 308 and the correlation index CI for each response RSP is used to phase adjust the replica carrier signal RCS that is used to down convert response to generate the corresponding OOK modulated subcarrier signal SUBC-MOD for each response.

Figures 5A, 5B, 5C, 5D:
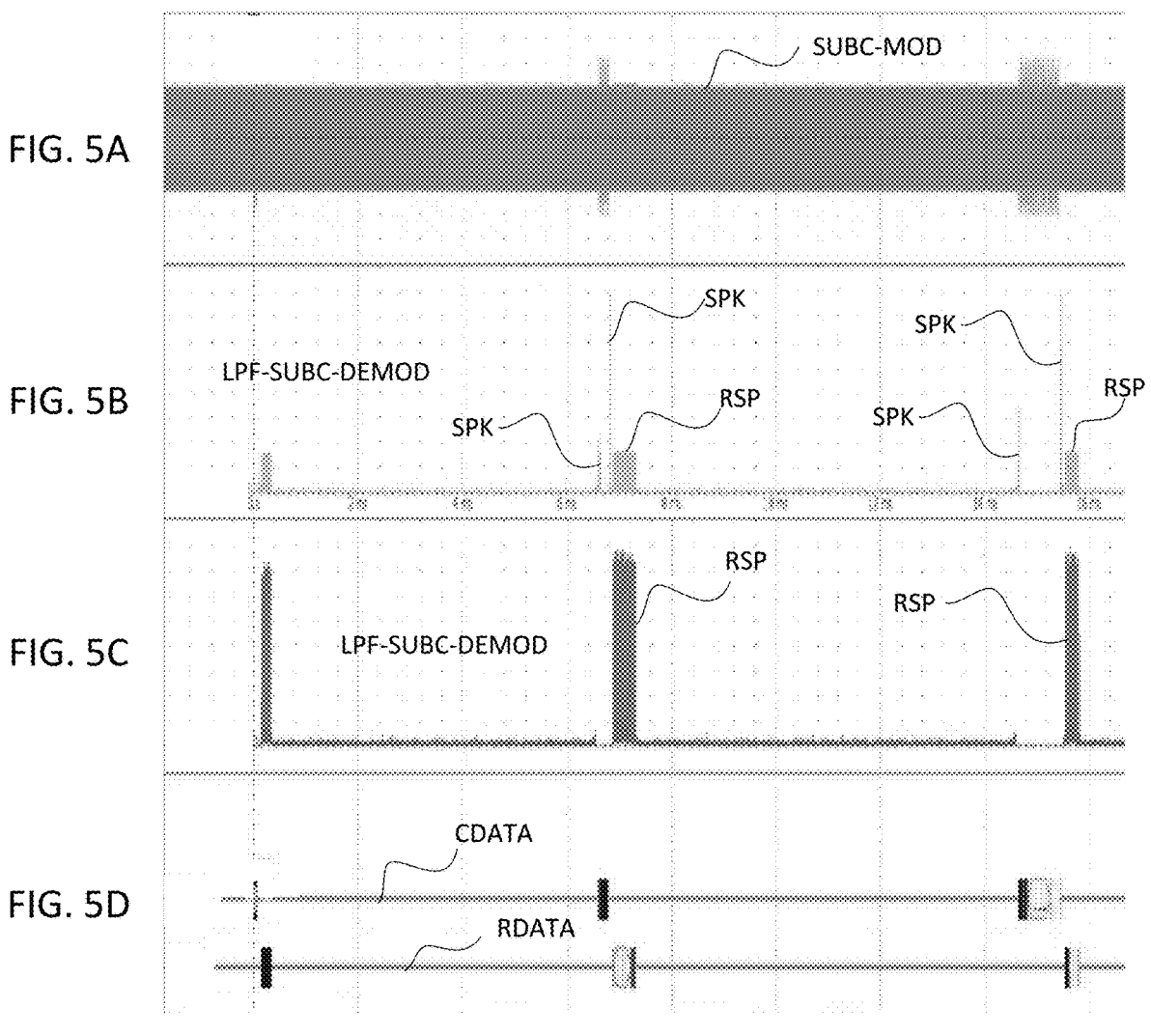

Once operation 308 has generated the OOK modulated subcarrier signal SUBC-MOD for each response, the process 300 then proceeds to operation 310 and the OOK modulated subcarrier signal SUBC-MOD for each response RSP is low pass filtered to generate a demodulated low pass filtered subcarrier signal LPF-SUBC-DEMOD. The demodulated low pass filtered subcarrier signal LPF-SUBC-DEMOD will include voltage peaks or spikes SPK caused by the phase change resulting from adjusting the phase of the replica carrier signal through the use of the correlation index CI for each response RSP. These voltage spikes SPK and removal of the spikes will now be described in more detail with reference to the FIGS. 5A-5D, which are signal timing diagrams illustrating the suppression or removal of these voltage spikes. FIG. 5A shows the down converted OOK modulated subcarrier signal SUBC-MOD output from the mixer 202 (FIG. 2) and FIG. 5B illustrates the demodulated low pass filtered subcarrier signal LPF-SUBC-DEMOD. The low pass filtered subcarrier signal LPF-SUBC-DEMOD includes the responses RSP and also includes voltage spikes SPK present just before each response in the demodulated low pass filtered subcarrier signal. These spikes SPK in the low pass filtered subcarrier signal LPF-SUBC-DEMOD result from the muting or removal of the commands CMD in the OOK modulated subcarrier signal SUBC-MOD, as discussed above with reference to FIG. 4E. Setting the voltage levels to zero for the samples of the CMD portions of the modulated subcarrier signal SUBC-MOD may result in a phase discontinuity at the beginning and end of the removed commands CMD (see 406, 408, 410 in FIG. 4E), with these phase discontinuities causing generation of the spikes SPK in the low pass filtered subcarrier signal LPF-SUBC-DEMOD as seen in FIG. 5B.

From operation 310, the process 300 proceeds to operation 312 and the spikes SPK in the low pass filtered subcarrier signal LPF-SUBC-DEMOD are removed as shown in FIG. 5C. In some embodiments, the positions of the spikes SPK are identified utilizing a frame delay time (FDT) parameter defined in the ISO/IEC 14443A standard, where the frame delay time $FDT=(1172/F_C)$ and $F_C$ is 13.56 MHz in this standard. Each command CMD is included in a frame as defined in the ISO/IEC 14443A standard. The samples of the low pass filtered subcarrier signal LPF-SUBC-DEMOD are set to zeros for the time intervals that include the end of the frame including the command CMD and the beginning of the following response RSP. The time interval $-FDT/2$ to $+FDT/2$ is used to set portions of the low pass filtered subcarrier signal LPF-SUBC-DEMOD that would include the spikes SPK to zero and thereby eliminate or remove the spikes.

From operation 312, the process 300 goes to operation 314 and compares voltage thresholds to the low pass filtered subcarrier signal LPF-SUBC-DEMOD for each response RSP to complete the decoding of each response RSP. FIG. 5D shows command data CDATA corresponding to the decoded commands CMD encoded on the modulated carrier signal MCS by the polling device 108 and response data RDATA corresponding to the decoded responses RSP as generated in operation 314.

FIGS. 6A and 6B are a flowchart illustrating in more detail a demodulation process 600 executed by the phase-aligned demodulator 104 of FIG. 1. The process 600 begins in operation 602 and test and measurement instrument 102 captures or acquires the modulated carrier signal MCS including the modulated commands CMD and responses RSP, and in operation 604 the response vector RV is generated, as discussed above with reference to the operations 302 and 304 in the process 300 of FIG. 3. From operation 604 the process 600 goes to operation 606 and a first variable q is set to 0, where the variable q used to process all the response RSP contained in the response vector RV. From operation 606 the process 600 then goes to operation 608 and determines whether the variable q is less than a response count RC of the response vector RV. The response count RC indicates the total number of responses RSP contained in the response vector RV. When the determination in operation 608 is negative, all responses RSP in the response vector RV have been processed and the process 600 goes to operation 610 and terminates.

When the determination in operation 608 is positive, the process 600 goes to operation 612 and determines a samples-per-cycle parameter SPC, where $SPC=(F_S/F_{SC})$ with $F_{SC}$ being the frequency of the OOK modulated subcarrier signal SUBC-MOD, which is $F_C/N$ or 848 KHz, and $F_S$ being a sampling frequency of the test and measurement instrument 102 (FIG. 1). The sampling frequency $F_S$ defines the rate at which the modulated carrier signal MCS is captured or sampled. The parameter SPC indicates the number of samples of the acquired modulated carrier signal MCS per cycle of the subcarrier signal SUBC-MOD. If a time between samples is defined as a time SCALE, then the sampling frequency $F_S=(1/SCALE)$. After calculating the parameter SPC in operation 612, the process 600 goes to operation 614 and a second variable k is set equal to zero. From operation 614 the process 600 goes to operation 616 and determines whether the variable k is less than or equal to the parameter SPC. The variable k tracks the processing of all samples of the modulated carrier signal SUBC-MOD for a given response RSP have been processed by the process 600.

From operation 616 the process 600 goes to operation 618 and two variables i and j are initiated (i=0 and j=k). The process 600 then goes from operation 618 to operation 620 and determines whether the variable i is less than a response size RS of the response RSP being processed minus the variable k (i.e., $i<(RS-k)$), where the response size is the size of the response in terms of the number of samples forming the response. Each of the signals being processed by the process 600 is a digital signal, as was mentioned above in relation to the process of 300 of FIG. 3. The response size RS is the size of each response RSP in terms of the number of samples forming the response. The operation 620 also determines whether the variable j is less than the response size RS (j<RS). When the determinations ($i<(RS-k)$ and (j<RS) in operation 620 are positive the process 600 proceeds to operation 622 and a variable INDEX is calculated for the current sample of the current response RSP being processed. The variable INDEX equals (r(t)cos(2π*FC/ N*SCALE)) where r(t) is the current sample of the current response RSP being processed.

The value of the variable INDEX is calculated in operation 622 and stored in a demodulation vector DEMODV in operation 624. From operation 624 the process 600 goes to operation 626 and the variables i and j are incremented and then the process returns to operation 620 to determine whether processing of the portion of the current response RSP being processed has been completed. The process 600 continues executing the operations 620-626 to process samples of current response and determine the correlation index CI of this response. This processing continues until the determination in operation 620 is negative, at which point the process 600 goes to operation 628 and stores a variable MAXINDEX for the current response RSP, where the variable MAXINDEX is the maximum value stored in the generated demodulation vector DEMODV for the response. The variable MAXINDEX corresponds to the correlation index CI for the current response RSP being processed. After the operation 628 the process 600 goes to operation 630, increments the variable k, and then returns to operation 616 to continue processing of the current response RSP through execution of operations 616 to 630.

When the determination in operation 616 is negative, the variable MAXINDEX corresponding to the correlation index CI for the current response RSP has been determined, and the process 600 goes from operation 616 to operation 632 in FIG. 6B to demodulate the current response using the correlation index. In operation 632, the process 600 retrieves the correlation index CI (MAXINDEX) for the current response RSP and then proceeds to operation 634 and sets a variable i=0 and a variable j=MAXINDEX. From operation 634 the process 600 then proceeds to operation 636 and determines whether the variable i is less than a variable SIZE-SUBC-MOD, which corresponds to the size (number of samples) of the signal SUBC-MOD output by the mixer 202 of FIG. 2. The operation 636 also determines whether the variable j is less than the size (number of samples) of the response RSP being demodulated. When the determination in operation 636 is positive, the process 600 proceeds to operation 638 and calculates a value for a final response output signal FINALRSPOUT that corresponds to the signal SUBC-MOD as indicated in FIG. 2. From operation 638 the process 600 proceeds to operation 640 and increments the variables i and j, and thereafter returns to operation 636. As long as the determination in operation 636 is true, meaning more values signal FINALRSPOUT need to be calculated, the process continues executing the operations 636 to 640 to thereby generate all values for the signal FINALRSPOUT. When the determination in operation 636 is negative, all values for the signal FINALRSPOUT for the current response RSP being demodulated have been calculated. The process 600 goes from operation 636 to operation 642 in this situation and increments the variable q that indicates the current response in the captured modulated carrier signal MCS that is being demodulated. From operation 642, the process 600 returns to 608 and determines whether the next response RSP is to now be modulated or all responses have been demodulated and the process 600 is to terminate at operation 610.

Demodulating responses RSP through the processes 300 of FIG. 3 or 600 of FIGS. 6A and 6B reduce the variation in amplitudes of detectedj responses. As discussed above, the peak-to-peak amplitude of responses RSP contained in the modulated subcarrier signal SUBC-MOD on the modulated carrier signal MCS are very small, typically being below 1 mv and including distortion on the signal. Adjusting the thresholds utilized to reliably demodulate such responses RSP is difficult. The processes 300 and 600, as implemented by the phase-aligned subcarrier demodulator 104 of FIG. 1, reduces such issues in demodulating the OOK modulate subcarrier signals of responses RSP utilized with NFC-A type devices. Embodiments of the present disclosure reduce variation in amplitudes of the responses RSP being demodulated that result from phase misalignment with the replica carrier signal RCS.

Figures 7A, 7B, 7C, 7D, 7E, 7F:
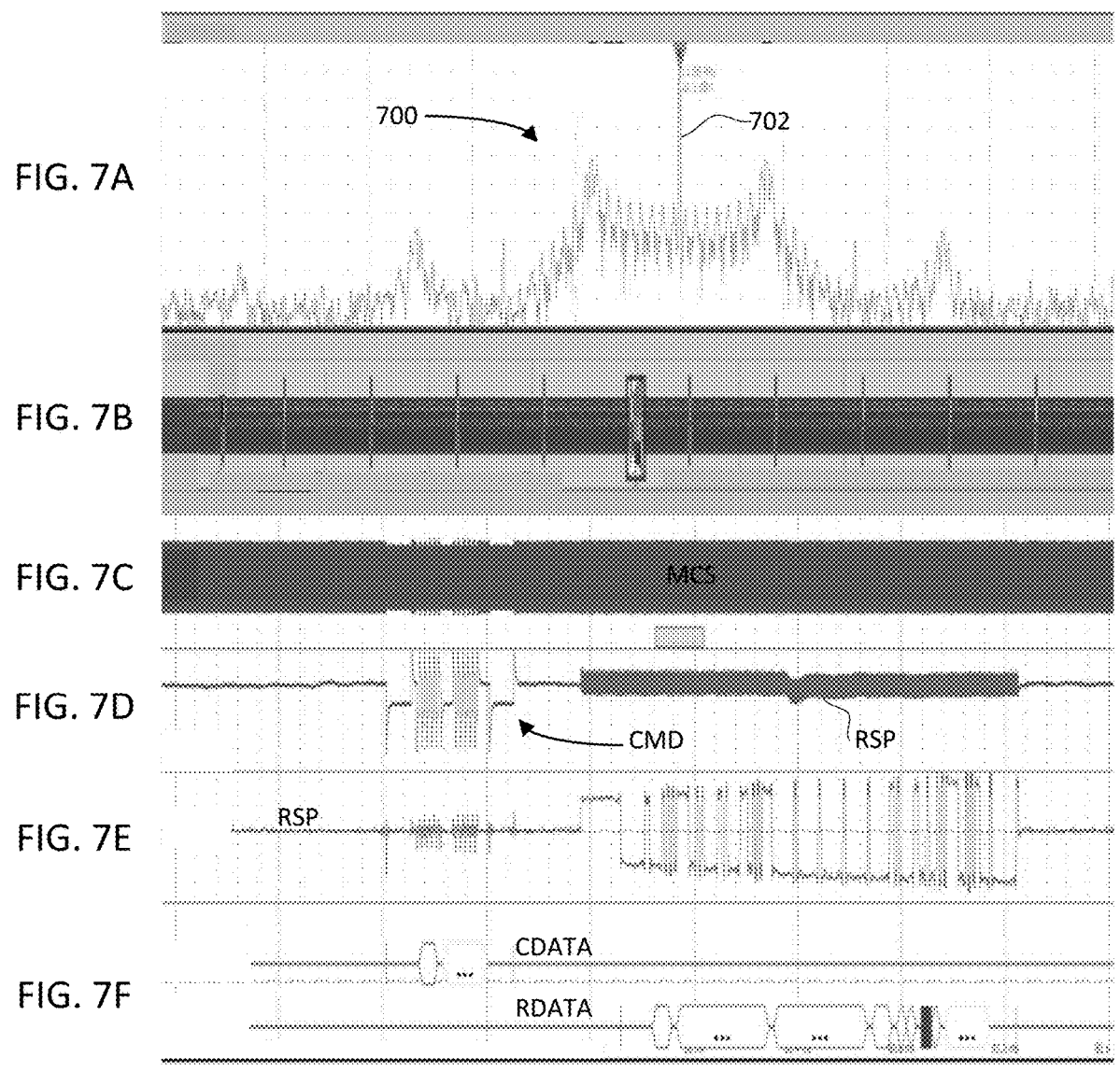

FIGS. 7A-7F are signal timing diagrams showing signals utilized and generated by the phase-aligned demodulator 104 of FIG. 1 during operation with NFC-B type devices in decoding BPSK modulated subcarrier signals SUBC-MOD in accordance with some embodiments of the present disclosure. Each of the signal diagrams 7B-7F shows voltage along the vertical axis and time along the horizontal axis while FIG. 7A shows frequency along the horizontal axis and magnitude along the vertical axis. As noted above, the phase-aligned demodulator 104 in accordance with embodiments of the present disclosure may be utilized in demodulating responses RSP of NFC-B type NFC-enabled devices as well as NFC-A type devices as described above in relation to FIGS. 1-6. Where the NFC-enabled devices 106 of FIG. 1 are NFC-B type devices, the modulated subcarrier signal SUBC-MOD is a BPSK modulated carrier signal and as opposed to the OOK modulated subcarrier signal described above for the NFC-A type devices. Thus, the process executed is to demodulate the BPSK modulated subcarrier signals SUBC-MOD is substantially the same as the processes 300 and 600 described above except instead of after generating the modulated subcarrier signal SUBC-MOD (output of the mixer 202 in FIG. 2, the subcarrier signal is BPSK modulated and so low pass filtering must be applied to this BPSK-modulated signal to demodulate this subcarrier signal.

FIG. 7A shows the frequency domain analysis of the modulated carrier signals MCS captured by the test and measurement instrument 102 in the form of a frequency or spectrum view 700 of the acquired signal. The spectrum view 700 also shows, as does the spectrum view 400 of FIG. 4A for the ISO/IED 14443A standard, a peak component 702, which is at a frequency of approximately 13.56 MHz and corresponds to the carrier signal as specified in the ISO/IEC 14443B standard. FIG. 7B shows the IQ data generated by the test and measurement instrument 102 from the frequency domain FIG. 7C shows the acquired modulated carrier signal MCS on an exploded time scale, with the modulated carrier signal MCS of FIG. 7C corresponding to a portion 404 of the modulated carrier signal MCS of FIG. 7B. FIG. 7D shows a command CMD and a response RSP on the modulated carrier signal MCS. FIG. 7E shows the demodulated response RSP of FIG. 7D as demodulated by the phase-aligned subcarrier demodulator 104 according to embodiments of the present disclosure. FIG. 7F shows command data CDATA corresponding to the decoded commands CMD encoded on the modulated carrier signal MCS by the polling device 108 and response data RDATA corresponding to the responses RSP encoded in the BPSK modulated subcarrier signal SUBC-MOD as decoded by the test and measurement instrument 102 (FIG. 1) in accordance with the ISO/IEC 14443B standard in this embodiment.

Aspects of the disclosure may operate on particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

EXAMPLES

Illustrative examples of the technologies disclosed herein are provided below. A configuration of the technologies may include any one or more, and any combination of, the examples described below.

Example 1 is a method including: detecting commands and responses contained in a modulated carrier signal; removing the detected commands to generate a response vector including the removed commands and the detected responses; identifying a correlation index for each response in the response vector, each correlation index indicating a phase of a modulated carrier signal of the corresponding response relative to a replica carrier signal; adjusting a phase of the replica carrier signal based on the correlation index for each response in the response vector to phase align the replica carrier signal and modulated carrier signal for the response; demodulating each response in the response vector using the replica carrier signal having the corresponding adjusted phase to generate a demodulated response vector including a plurality of demodulated responses; and low pass filtering the demodulated response vector to generate a decoded response vector.

Example 2 is a method according to Example 1, detecting the commands contained in the modulated carrier signal comprises detecting voltage transitions or edges in the modulated carrier signal to identify the beginning and end of respective commands.

Example 3 is a method according to Example 2, wherein detecting the commands further comprises detecting edges in the modulated carrier signal based on a duration of signals pulses forming the commands.

Example 4 is a method according to Example 2, wherein detecting the responses contained in the modulated carrier signal comprises detecting responses based on a final edge of each of the detected commands and a known duration of each response.

Example 5 is a method according to Example 1, wherein the modulated carrier signal is a digital signal including a plurality of samples and wherein removing the detected commands comprises setting samples to zero in the response vector for samples corresponding to portions of the modulated carrier signal including the detected commands.

Example 6 is a method according to Example 1, wherein low pass filtering each of the demodulated responses comprises low pass filtering each of the demodulated responses to generate a low pass filtered demodulated subcarrier signal.

Example 7 is a method according to Example 6, wherein the low pass filtered demodulated carrier signal includes voltage spikes at locations in the signal where the detected commands were removed, and wherein the method further comprises suppressing these voltage spikes.

Example 8 is a method according to Example 7 further including: identifying the positions of voltage spikes associated with the ends of detected commands that were removed; and identifying the positions of voltage spikes associated with the start of detected commands that were removed.

Example 9 is a method according to Example 1 further including: transmitting, from a proximity coupling device, the modulated carrier signal; and load modulating, through a proximity integrated circuit card, the transmitted modulated carrier signal from the proximity coupling device to generate the modulated subcarrier signal on the transmitted modulated carrier signal.

Example 10 is a method according to Example 9, wherein the modulated carrier signal comprises an OOK modulated subcarrier signal when the proximity coupling device and proximity integrated circuit card are NFC-A type devices operating according to the ISO/IEC 14443A standard, and wherein the modulated carrier signal comprises a BPSK modulated subcarrier signal when the proximity coupling device and proximity integrated circuit card are NFC-B type devices operating according to the ISO/IEC 14443B standard.

Example 11 is a test and measurement system, including: a proximity coupling device configured to transmit a modulated carrier signal; a proximity integrated circuit card configured to load modulate the transmitted modulated carrier signal to generate a modulated subcarrier signal on the transmitted wireless carrier; and a test and measurement instrument including one or more processors configured to acquire the modulated carrier signal and including a phase-aligned subcarrier demodulator, the phase-aligned subcarrier demodulator configured, in order to demodulate the modulated subcarrier signal, to: detect commands and responses contained in the modulated carrier signal; remove the detected commands to generate a response vector including the removed commands and the detected responses; identify a correlation index for each response in the response vector, each correlation index indicating a phase of a modulated carrier signal of the corresponding response relative to a replica carrier signal; adjust a phase of the replica carrier signal based on the correlation index for each response in the response vector to phase align the replica carrier signal and modulated carrier signal for the response; demodulate each response in the response vector using the replica carrier signal having the corresponding adjusted phase to generate a demodulated response vector including a plurality of demodulated responses; and low pass filter the demodulated response vector to generate a decoded response vector.

Example 12 is a test and measurement system according to Example 11, wherein the test and measurement instrument is an oscilloscope.

Example 13 is a test and measurement system according to Example 11 further including an RF probe configured to be positioned proximate the proximity coupling device and proximity integrated circuit card to sense the modulated carrier signal.

Example 14 is a test and measurement system according to Example 11, wherein the phase-aligned subcarrier demodulator is configured, as part of detecting commands, to detect voltage transitions or edges in the modulated carrier signal to identify the beginning and end of respective commands.

Example 15 is a test and measurement system according to Example 14, wherein the phase-aligned subcarrier demodulator is further configured to detect edges in the modulated carrier signal based on a duration of signals pulses forming the commands.

Example 16 is a test and measurement system according to Example 11, wherein the phase-aligned subcarrier demodulator is further configured to detect the responses contained in the modulated carrier signal based on a final edge of each of the detected commands and a known duration of each response.

Example 17 is a test and measurement system according to Example 11, wherein the modulated carrier signal is a digital signal including a plurality of samples and wherein the phase-aligned subcarrier demodulator is configured to remove the detected commands by setting samples to zero in the response vector for samples corresponding to portions of the modulated carrier signal including the detected commands.

Example 18 is a test and measurement system according to Example 11, wherein low pass filtering each of the demodulated responses comprises low pass filtering each of the demodulated responses to generate a low pass filtered demodulated subcarrier signal including voltage spikes at locations in the signal where the detected commands were removed, and wherein the phase-aligned subcarrier demodulator is further configured to suppress these voltage spikes.

Example 19 is a test and measurement system, including: a proximity coupling device configured to transmit a modulated carrier signal; a proximity integrated circuit card configured to load modulate the transmitted modulated carrier signal to generate one of an OOK and a BPSK modulated subcarrier signal on the transmitted wireless carrier; and a test and measurement instrument configured to acquire the modulated carrier signal, the test and measurement instrument including a phase-aligned subcarrier demodulator configured to demodulate the modulated subcarrier signal, the phase-aligned subcarrier demodulator configured to: detect commands and responses contained in the modulated carrier signal; remove the detected commands to generate a response vector including the removed commands and the detected responses; identify a correlation index for each response in the response vector, each correlation index indicating a phase of a modulated carrier signal of the corresponding response relative to a replica carrier signal; adjust a phase of the replica carrier signal based on the correlation index for each response in the response vector to phase align the replica carrier signal and modulated carrier signal for the response; down convert each response in the response vector using the replica carrier signal having the corresponding adjusted phase to generate a modulated subcarrier signal for each response in the response vector; and low pass filter the modulated subcarrier signals to generate a decoded response vector.

Example 20 is a test and measurement system according to Example 19, wherein the test and measurement instrument is mixed signal oscilloscope.

The foregoing description has been set forth merely to illustrate example embodiments of present disclosure and is not intended to be limiting. Since modifications of the disclosed embodiments incorporating the substance of the invention may occur to person skilled in the art, the invention should be construed to include everything within the scope of the invention.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A method, comprising:

detecting commands and responses contained in a modulated carrier signal;

removing the detected commands to generate a response vector including the removed commands and the detected responses;

identifying a correlation index for each response in the response vector, each correlation index indicating a phase of a modulated carrier signal of the corresponding response relative to a replica carrier signal;

adjusting a phase of the replica carrier signal based on the correlation index for each response in the response vector to phase align the replica carrier signal and modulated carrier signal for the response;

demodulating each response in the response vector using the replica carrier signal having the corresponding adjusted phase to generate a demodulated response vector including a plurality of demodulated responses; and low pass filtering the demodulated response vector to generate a decoded response vector.

2. The method of claim 1, wherein detecting the commands contained in the modulated carrier signal comprises detecting voltage transitions or edges in the modulated carrier signal to identify the beginning and end of respective commands.

3. The method of claim 2, wherein detecting the commands further comprises detecting edges in the modulated carrier signal based on a duration of signals pulses forming the commands.

4. The method of claim 2, wherein detecting the responses contained in the modulated carrier signal comprises detecting responses based on a final edge of each of the detected commands and a known duration of each response.

5. The method of claim 1, wherein the modulated carrier signal is a digital signal including a plurality of samples and wherein removing the detected commands comprises setting samples to zero in the response vector for samples corresponding to portions of the modulated carrier signal including the detected commands.

6. The method of claim 1, wherein low pass filtering each of the demodulated responses comprises low pass filtering each of the demodulated responses to generate a low pass filtered demodulated subcarrier signal.

7. The method of claim 6, wherein the low pass filtered demodulated carrier signal includes voltage spikes at locations in the signal where the detected commands were removed, and wherein the method further comprises suppressing these voltage spikes.

8. The method of claim 7 further comprising:

identifying the positions of voltage spikes associated with the ends of detected commands that were removed; and identifying the positions of voltage spikes associated with the start of detected commands that were removed.

9. The method of claim 1 further comprising:

transmitting, from a proximity coupling device, the modulated carrier signal; and load modulating, through a proximity integrated circuit card, the transmitted modulated carrier signal from the proximity coupling device to generate the modulated subcarrier signal on the transmitted modulated carrier signal.

10. The method of claim 9, wherein the modulated carrier signal comprises an OOK modulated subcarrier signal when the proximity coupling device and proximity integrated circuit card are NFC-A type devices operating according to the ISO/IEC 14443A standard, and wherein the modulated carrier signal comprises a BPSK modulated subcarrier signal when the proximity coupling device and proximity integrated circuit card are NFC-B type devices operating according to the ISO/IEC 14443B standard.

11. A test and measurement system, comprising:

a proximity coupling device configured to transmit a modulated carrier signal;

a proximity integrated circuit card configured to load modulate the transmitted modulated carrier signal to generate a modulated subcarrier signal on the transmitted wireless carrier; and a test and measurement instrument including one or more processors configured to acquire the modulated carrier signal and including a phase-aligned subcarrier demodulator, the phase-aligned subcarrier demodulator configured, in order to demodulate the modulated subcarrier signal, to:

detect commands and responses contained in the modulated carrier signal;

remove the detected commands to generate a response vector including the removed commands and the detected responses;

identify a correlation index for each response in the response vector, each correlation index indicating a phase of a modulated carrier signal of the corresponding response relative to a replica carrier signal;

adjust a phase of the replica carrier signal based on the correlation index for each response in the response vector to phase align the replica carrier signal and modulated carrier signal for the response;

demodulate each response in the response vector using the replica carrier signal having the corresponding adjusted phase to generate a demodulated response vector including a plurality of demodulated responses; and low pass filter the demodulated response vector to generate a decoded response vector.

12. The test and measurement system of claim 11, wherein the test and measurement instrument is an oscilloscope.

13. The test and measurement system of claim 11 further comprising an RF probe configured to be positioned proximate the proximity coupling device and proximity integrated circuit card to sense the modulated carrier signal.

14. The test and measurement system of claim 11, wherein the phase-aligned subcarrier demodulator is configured, as part of detecting commands, to detect voltage transitions or edges in the modulated carrier signal to identify the beginning and end of respective commands.

15. The test and measurement system of claim 14, wherein the phase-aligned subcarrier demodulator is further configured to detect edges in the modulated carrier signal based on a duration of signals pulses forming the commands.

16. The test and measurement system claim 11, wherein the phase-aligned subcarrier demodulator is further configured to detect the responses contained in the modulated carrier signal based on a final edge of each of the detected commands and a known duration of each response.

17. The test and measurement system of claim 11, wherein the modulated carrier signal is a digital signal including a plurality of samples and wherein the phase-aligned subcarrier demodulator is configured to remove the detected commands by setting samples to zero in the response vector for samples corresponding to portions of the modulated carrier signal including the detected commands.

18. The test and measurement system of claim 11, wherein low pass filtering each of the demodulated responses comprises low pass filtering each of the demodulated responses to generate a low pass filtered demodulated subcarrier signal including voltage spikes at locations in the signal where the detected commands were removed, and wherein the phase-aligned subcarrier demodulator is further configured to suppress these voltage spikes.

19. A test and measurement system, comprising:

a proximity coupling device configured to transmit a modulated carrier signal;

a proximity integrated circuit card configured to load modulate the transmitted modulated carrier signal to generate one of an OOK and a BPSK modulated subcarrier signal on the transmitted wireless carrier; and a test and measurement instrument configured to acquire the modulated carrier signal, the test and measurement instrument including a phase-aligned subcarrier demodulator configured to demodulate the modulated subcarrier signal, the phase-aligned subcarrier demodulator configured to:

detect commands and responses contained in the modulated carrier signal;

remove the detected commands to generate a response vector including the removed commands and the detected responses;

identify a correlation index for each response in the response vector, each correlation index indicating a phase of a modulated carrier signal of the corresponding response relative to a replica carrier signal;

adjust a phase of the replica carrier signal based on the correlation index for each response in the response vector to phase align the replica carrier signal and modulated carrier signal for the response;

down convert each response in the response vector using the replica carrier signal having the corresponding adjusted phase to generate a modulated subcarrier signal for each response in the response vector; and low pass filter the modulated subcarrier signals to generate a decoded response vector.

20. The test and measurement system of claim 19, wherein the test and measurement instrument is a mixed signal oscilloscope.

\* \* \* \* \*